US008956553B2

(12) United States Patent
Zhou et al.

(10) Patent No.: US 8,956,553 B2
(45) Date of Patent: Feb. 17, 2015

(54) FLUORESCENT POWDER OF HALOGEN SILICATE CONTAINING NANO-METAL PARTICLES AND PREPARATION METHOD THEREOF

(75) Inventors: Mingjie Zhou, Shenzhen (CN); Jun Liu, Shenzhen (CN); Wenbo Ma, Shenzhen (CN)

(73) Assignee: Ocean's King Lighting Science & Technology Co., Ltd., Shenzhen, Guangdong (CN)

( * ) Notice: Subject to any disclaimer, the term of this patent is extended or adjusted under 35 U.S.C. 154(b) by 189 days.

(21) Appl. No.: 13/703,317

(22) PCT Filed: Jun. 29, 2010

(86) PCT No.: PCT/CN2010/074741
§ 371 (c)(1),
(2), (4) Date: Dec. 10, 2012

(87) PCT Pub. No.: WO2012/000176
PCT Pub. Date: Jan. 5, 2012

(65) Prior Publication Data
US 2013/0075658 A1    Mar. 28, 2013

(51) Int. Cl.
*C09K 11/08* (2006.01)
*C09K 11/77* (2006.01)
(Continued)

(52) U.S. Cl.
CPC ......... *C09K 11/7734* (2013.01); *C09K 11/7733* (2013.01); *C09K 11/873* (2013.01); *B82Y 40/00* (2013.01); *Y10S 977/775* (2013.01); *Y10S 977/90* (2013.01); *B82Y 30/00* (2013.01)
USPC ..................... 252/301.4 F; 977/775; 977/900

(58) Field of Classification Search
CPC ........ C09K 11/02; C09K 11/58; C09K 11/59; C09K 11/87; C09K 11/592; C09K 11/7734; C09K 11/7774; H01L 33/501; B82Y 40/00; Y10S 977/773
USPC ........ 252/301.4 F, 301.4 H, 301.6 F, 301.4 R, 252/301.36; 428/690; 423/326; 977/773
See application file for complete search history.

(56) References Cited

FOREIGN PATENT DOCUMENTS

| CN | 1186103 A | 7/1998 |
| CN | 101462696 A | 6/2009 |

(Continued)

OTHER PUBLICATIONS

Yang Zhi-Ping, et al. "Luminesce properties of the single white emitting phosphor Eu2+, Mn2+ co-doped Ca2SiO3Cl2", Jan. 2007, Acta Physica CA Sinica, vol. 56, No. 1, pp. 546-549.*

(Continued)

*Primary Examiner* — Carol M Koslow
*Assistant Examiner* — Lynne Edmondson
(74) *Attorney, Agent, or Firm* — Shimokaji & Associates P.C.

(57) ABSTRACT

Provided is a fluorescent powder of halogen-silicate containing nano-metal particles with the formula of $CaX_2 \cdot y(Ca_{1-a-b}Eu_aMn_bO) \cdot SiO_2 : zM$, wherein X is fluorin or/and chlorine, y is 1 or 2, z is molar ratio of nano-metal particles and fluorescent powder $CaX_2 \cdot y(Ca_{1-a-b}Eu_aMn_bO) \cdot SiO_2$, $0 < z \leq 1 \times 10^{-2}$, $0 < a \leq 0.3$, $0 \leq b \leq 0.3$. The method for preparing the fluorescent powder is also provided. For the surface plasma resonance effect occurring on the surface of the nano-metal particles, the fluorescent powder has stronger luminous intensity. The preparation method is simple to operate, no pollution, easy to control, easy to produce in industry, and can be widely used in the preparation field of fluorescent powder.

9 Claims, 3 Drawing Sheets (51) Int. Cl.
*C09K 11/87* (2006.01)
*B82Y 40/00* (2011.01)
*B82Y 30/00* (2011.01)

(56) References Cited

FOREIGN PATENT DOCUMENTS

| | | | |
|---|---|---|---|
| JP | 2001-288466 A | | 10/2001 |
| JP | 2001-288467 A | | 10/2001 |
| JP | 2007-217605 A | | 8/2007 |
| JP | 2007217605 A | * | 8/2007 |
| JP | 2007217605 A | * | 8/2007 |
| JP | 2009-007616 A | | 1/2009 |
| JP | 2010-506006 A | | 2/2010 |
| KR | 10-0289531 B1 | * | 5/2001 |
| KR | 1020050027986 A | | 3/2005 |

OTHER PUBLICATIONS

Machine translation of KR 10-02895391 B1, received Aug. 4, 2014.*
Yang Zhi-Ping, et al. Luminesce properties of the single white emitting phosphor Eu2+, Mn2+ co-doped Ca2SiO3Cl2. Acta Physica Sinica, vol. 56, No. 1, Jan. 2007.
Yu-Lin Min, et al. Au@Y2O3:Eu3+ rare earth oxide hollow sub-microspheres with encapsulated gold nanoparticles and their optical properties. Solid state science. Nov. 2009 96-101.
Weijia Ding, et al. An intense green/yellow dual-chromatic calcium chlorosilicate phosphor Ca3SiO4Cl2: Eu2+—Mn2+ for Yellow and White LED. Journal of The Electrochemical Society, 155(5) J122-J127 (2008).
Chen Can et al. Preparation and optical absorption properties of Ag/NiO composite films, Rare Metal Materials and Engineering, Aug. 2007, vol. 36,Suppl. 1, pp. 885-888.

* cited by examiner

FLUORESCENT POWDER OF HALOGEN SILICATE CONTAINING NANO-METAL PARTICLES AND PREPARATION METHOD THEREOF

FIELD OF THE INVENTION

The present invention relates to a fluorescent powder and preparation method thereof. More particularly, the invention relates to a fluorescent powder of halogen silicate containing nano-metal particles used in white light LED and preparation method thereof.

BACKGROUND OF THE INVENTION

Compared to traditional light source, such as filament lamps, fluorescent lamps, LED light source has raised public concerns which exhibits lots of advantages like powder saving, energy saving, being green (free of mercury), long life (up to several hundred thousand hours), shock resistant, impact resistant, quick response and others. With the progress of the technology, people forecast that white light LED solid lighting technology will be the fourth generation light source, which will replace gradually the current filament lamps of low efficiency and mercury-containing fluorescent lamps which pollute the environment. Nevertheless, at present, the white light is currently formed by combining yellow fluorescent powder and LED blue light. The emitting color of device varies by the driving voltage and the coating thickness of fluorescent powder. As the temperature rising, the main peaks of yellow fluorescent powder shift, leading to poor color rendition and low color rendering index. To solve such problems, one idea is to develop fluorescent powder used in white light LED which can be excited by InGaN chips in the wavelength range of near-UV (340~420 nm) or blue light at a wavelength of 460 nm. However, the excitation wavelength of the present fluorescent powders of fluorescent lamps fails to match the main emission wavelength in the near-UV range of LED. Therefore, it is extremely urgent for people search for fluorescent powders suitable for UV-LED chips excitation (340~420 nm).

SUMMARY OF THE INVENTION

The technical problem of the present invention to be solved is to provide a fluorescent powder of halogen silicate containing nano-metal particles with high luminous intensity, of which the emission wavelength can be tuned, and to provide preparation method thereof, resulting in solving the problems, such as poor color rendition of fluorescent powder, seriously impact on quality of white light, and so on.

The technical solution to solve the technical problem of the present invention is: to provide a fluorescent powder of halogen silicate containing nano-metal particles, said fluorescent powder of halogen-silicate containing nano-metal particles is a mixture of $CaX_2 \cdot y(Ca_{1-a-b}Eu_aMn_bO) \cdot SiO_2$ and zM, wherein X is fluorine and/or chlorine, y is 1 or 2, z is molar ratio of nano-metal particles and fluorescent powder $CaX_2 \cdot y(Ca_{1-a-b}Eu_aMn_bO) \cdot SiO_2$, z is the range of $0<z\leq 1\times 10^{-2}$, a is the range of $0<a\leq 0.3$, b is the range of $0\leq b\leq 0.3$.

The technical solution to solve the technical problem of the present invention is: to provide a fluorescent powder of halogen silicate containing nano-metal particles, said fluorescent powder of halogen-silicate containing nano-metal particles is a mixture of $CaX_2 \cdot y(Ca_{1-a-b}Eu_aMn_bO) \cdot SiO_2$ and zM, wherein X is fluorine and/or chlorine, y is 1 or 2, z is molar ratio of nano-metal particles and fluorescent powder $CaX_2 \cdot y$ $(Ca_{1-a-b}Eu_aMn_bO) \cdot SiO_2$, z is in a range of $0<z\leq 1\times 10^{-2}$, a is in a range of $0<a\leq 0.3$, b is in a range of $0\leq b\leq 0.3$.

The fluorescent powder of the present invention, said nano-metal particles M is one of nano-metal particles Ag, Au, Pt or Pd.

And, a method for preparing fluorescent powder of halogen-silicate containing nano-metal particles, comprising:

step 1, preparing nano-metal particles colloid;

step 2, adding surface treating agent into nano-metal particles colloid to carry out surface treatment of nano-metal particles;

step 3, adding absolute alcohol, deionized water and ammonia water to nano-metal particles colloid obtained in step 2, stirring, then adding tetraethyl orthosilicate with stiffing and reacting, then drying, pre-burning, grinding to obtain the desired $M@SiO_2$ powder;

step 4, selecting source compound of calcium, source compound of europium, source compound of manganese and halogenating calcium according to stoichiometric ratios, mixing, said stoichiometric ratios of the source compounds are according to the molar ratio of corresponding elements in $CaX_2 \cdot y(Ca_{1-a-b}Eu_aMn_bO)$, where X is fluorine and/or chlorine, y is 1 or 2, a is in a range of $0<a\leq 0.3$, b is in a range of $0\leq b\leq 0.3$, halogenating calcium is excessive 10% to 40% by weight;

step 5, adding $M@SiO_2$ powder obtained in step 3 into the mixture obtained in step 4, grinding, then pre-burning, cooling, grinding, then sintering in reducing atmosphere, grinding, washing, drying and sieving to obtain said fluorescent powder of halogen-silicate containing nano-metal particles.

In the present invention, said preparation of nano-metal particles colloid in said step 1 comprises: dissolving and diluting metal salt solution in ethanol or water, then adding one or more assistant agents which act as dispersant and stabilizer with stirring, adding reducing agent, after the reaction, nano-metal particles colloid is obtained. Said assistant agent is at least one of polyvinylpyrrolidone, sodium citrate, cetyl trimethyl ammonium bromide, sodium dodecyl sulfate and sodium dodecyl sulfonate; said reducing agent is at least one of hydrazine hydrate, ascorbic acid, sodium citrate and sodium borohydride.

In said step 2, polyvinylpyrrolidone is used as surface treating agent, weighing and adding 0.001 g/mL~0.1 g/mL of polyvinylpyrrolidone into nano-metal particles colloid, stirring for 3 to 24 hours at room temperature.

In said step 3, reacting time is in a range of 2 to 8 hours; drying is carried out under the constant temperature ranged from 80° C. to 150° C.; the temperature of pre-burning is in a range of 300° C. to 800° C.; the time of pre-burning is in a range of 2 to 5 hours; the volume of said tetraethyl orthosilicate equals the tetraethyl orthosilicate volume calculated according to the desired amount of the silicon source in final product.

In said step 4, said source compound of calcium, source compound of europium and source compound of manganese are selected from one of their oxides, carbonates, acetates and oxalates.

In said step 5, the temperature of pre-burning is in a range of 500° C. to 1000° C.; the time of pre-burning is in a range of 1 to 12 hours; the temperature of sintering is in a range of 800° C. to 1200° C.; the time of sintering is in a range of 1 to 8 hours. Said reducing atmosphere is mixed gases of nitrogen and hydrogen, or pure hydrogen, or carbon monoxide.

Compared to the prior art, the excitation of the fluorescent powder of the present invention is a kind of broadband excitation, two strong absorption broadband appear in the range of 300 to 450 nm. The emission spectrum formed by 4f→5d transition is broadband spectrum due to the overlap of $4f^6$ and 5d orbits of Eu ion in most matrixes; on the other hand, the f-d transition energy change apparently with the change of the crystallographic environment because of the naked 5d electron. The enhancement of crystalline field and covalent would lead to a decrease of the lower limit of $4f^65d$ energy level, causing redshift of emission wavelength. The weakening of crystalline field and covalent would lead to an increase of the lower limit of $4f^65d$ energy level, causing blueshift of emission wavelength. Also, there is a partial overlap between the excitation peak of Mn ion and emission peak of Eu ion, energy can transfer between them. Thus, the emission peaks of the fluorescent powder of the present invention can change by adjusting the content of Eu and Mn, or their proportion, obtaining emissions of long wave in different ranges, consequently, it is favorable for improving color rendering and color rendition. The fluorescent powder of the present invention is suitable for LED in near-UV range and blue light LED to excite, which can be used in white light LED devices.

The method for preparing fluorescent powder of the present invention comprises the steps: making nano-metal particles clad with silica first, then making flourescent powder containing nano-metal particles. Compared to flourescent powder non-containing nano-metal particles, due to the surface plasma resonance effect occurring on the surface of the nano-metal particles, the fluorescent powder has stronger luminous intensity. In addition, the preparation method is simple, no pollution, easy to control, low demand on equipment, easy to produce in industry, and can be widely used in the field of preparing fluorescent powder.

BRIEF DESCRIPTION OF THE DRAWINGS

Further description of the present invention will be illustrated, which combined with embodiments in the drawings.

DETAILED DESCRIPTION OF ILLUSTRATED EMBODIMENTS

Further description of the present invention will be illustrated, which combined with embodiments in the drawings, in order to make the purpose, the technical solution and the advantages clearer. While the present invention has been described with reference to particular embodiments, it will be understood that the embodiments are illustrative and that the invention scope is not so limited.

A fluorescent powder of halogen silicate containing nano-metal particles is provided, said fluorescent powder of halogen-silicate containing nano-metal particles has the formula of $CaX2 \cdot y(Ca1-a-bEuaMnbO) \cdot SiO2$ and zM, wherein X is fluorine and/or chlorine, y is 1 or 2, z is a molar ratio of nano-metal particles and fluorescent powder $CaX2 \cdot y(Ca1-a-bEuaMnbO) \cdot SiO2$, z is in a range of $0 < z \leq 1 \times 10^{-2}$, a is in a range of $0 < a \leq 0.3$, b is in a range of $0 \leq b \leq 0.3$ The fluorescent powder of the present invention, said nano-metal particles M is one of nano-metal particles Ag, Au, Pt or Pd.

Figure 1:
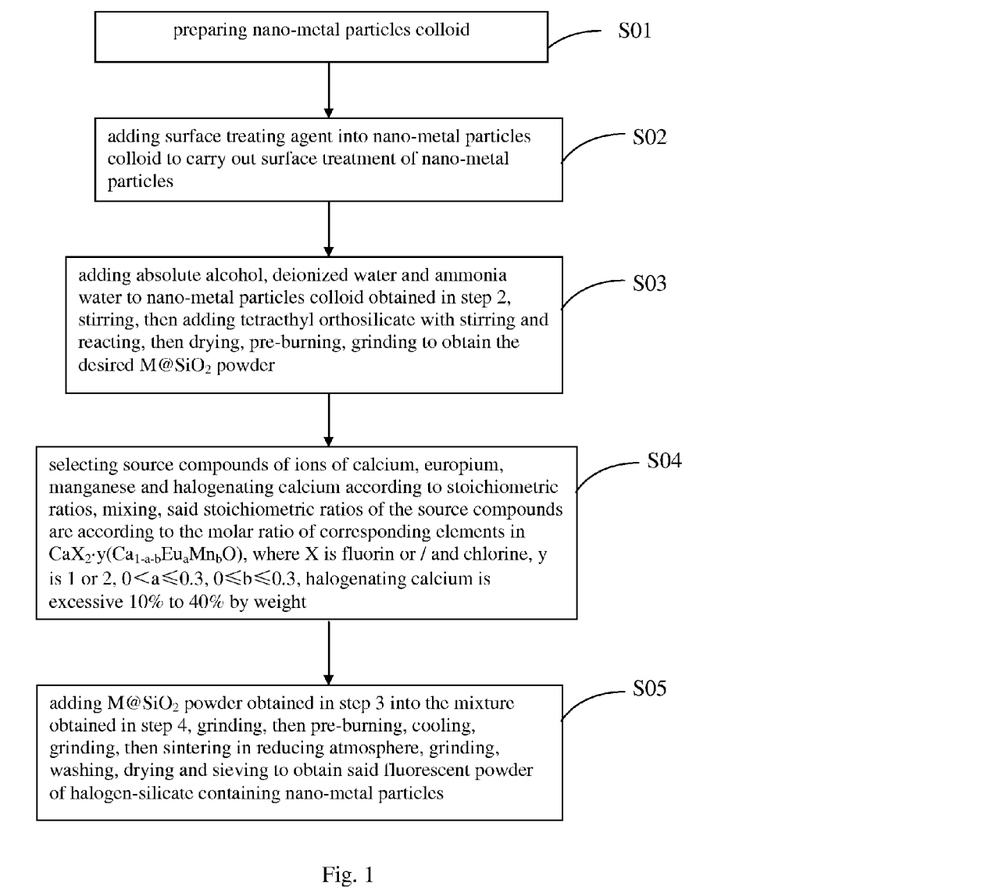
FIG. 1 is a flow chart of the preparation method of the present invention.

Referring to FIG. 1, FIG. 1 shows flow chart of the method for preparing fluorescent powder of halogen-silicate containing nano-metal particles of the present invention. The method comprises:

S01: preparing nano-metal particles colloid;

S02: adding surface treating agent into nano-metal particles colloid to carry out surface treatment of nano-metal particles;

S03: adding absolute alcohol, deionized water and ammonia water to nano-metal particles colloid obtained in step 2, stirring well, then adding tetraethyl orthosilicate, stirring well and reacting, then drying at constant temperature, pre-burning, grinding to obtain the desired $M@SiO_2$ powder;

S04: selecting source compound of calcium, source compound of europium, source compound of manganese and halogenating calcium according to stoichiometric ratios, mixing, said stoichiometric ratios of the source compounds are according to the molar ratio of corresponding elements in $CaX_2 \cdot y(Ca_{1-a-b}Eu_aMn_bO)$, where X is fluorine and/or chlorine, y is 1 or 2, a is in a range of $0 < a \leq 0.3$, b is in a range of $0 \leq b \leq 0.3$, halogenating calcium is excessive 10% to 40% by weight;

S05: adding $M@SiO_2$ powder obtained in step 3 into the mixture obtained in step 4, grinding, then pre-burning, cooling, grinding, then sintering in reducing atmosphere, grinding, washing, drying and sieving to obtain said fluorescent powder of halogen-silicate containing nano-metal particles.

In the present invention, said preparation of nano-metal particles colloid in said step 1 comprises: dissolving and diluting metal salt solution in ethanol or water to a certain concentration, then adding one or more assistant agents which act as dispersant and stabilizer with magnetically stirring, adding reducing agent, after the 10-45 min reaction, nano-metal particles colloid is obtained. Said assistant agent is at least one of polyvinylpyrrolidone (PVP), sodium citrate, cetyl trimethyl ammonium bromide, sodium dodecyl sulfate and sodium dodecyl sulfonate; said reducing agent is at least one of hydrazine hydrate, ascorbic acid, sodium citrate and sodium borohydride.

In said S02, polyvinylpyrrolidone is used as surface treating agent, weighing and adding 0.001 g/mL~0.1 g/mL of polyvinylpyrrolidone into nano-metal particles colloid, stirring for 3 to 24 hours at room temperature.

In said S03, cladding $SiO_2$ microspheres on the surface of nano-metal particles by StÖber method, reacting time is in a range of 2 to 8 hours; drying is carried out under the constant temperature ranged from 80° C. to 150° C.; the temperature of pre-burning is in a range of 300° C. to 800° C.; the time of pre-burning is in a range of 2 to 5 hours; the volume of said tetraethyl orthosilicate equals the tetraethyl orthosilicate volume calculated according to the desired amount of the silicon source in final product.

In said S04, said source compound of calcium, source compound of europium and source compound of manganese are selected from one of their oxides, carbonates, acetates and oxalates.

In said S05, the temperature of pre-burning is in a range of 500° C. to 1000° C.; the time of pre-burning is in a range of 1 to 12 hours; the temperature of sintering is in a range of 800° C. to 1200° C.; the time of sintering is in a range of 1 to 8 hours. Said reducing atmosphere is mixed gases of nitrogen and hydrogen, or pure hydrogen, or carbon monoxide.

When X is F or Cl, the doping level of metal nano-particles has little effect on the situation of main emission peaks. As the calcination temperature rising, the emission wavelength of the fluorescent increases up towards the red (redshift); with decreasing the atomic ratio of Eu and Mn, the wavelength increasing up towards the red (redshift); the doping levels of En and Mn are different, the emission wavelengths exhibit slight fluctuations.

Compared to the prior art, the excitation of the fluorescent powder of the present invention is a kind of broadband excitation, two strong absorption broadband appear in the range of 300 to 450 nm. In most matrixes, the emission spectrum formed by 4f→5d transition is broadband spectrum due to the overlap of $4f^6$ and 5d orbits of Eu ion; on the other hand, the f-d transition energy change apparently with the change of the crystallographic environment because of the naked 5d electron. The enhancement of crystalline field and covalent would lead to a decrease of the lower limit of $4f^65d$ energy level, causing redshift of emission wavelength. The weakening of crystalline field and covalent would lead to an increase of the lower limit of $4f^65d$ energy level, causing blueshift of emission wavelength. Also, there is a partial overlap between the excitation peaks of Mn ion and emission peaks of Eu ion, energy can transfer between them. Thus, the emission peaks of the fluorescent powder of the present invention can change by adjusting the content of Eu and Mn, or their proportion, obtaining emissions of long wave in different ranges, consequently, it is favorable for improving color rendering and color rendition. The fluorescent powder of the present invention is suitable for LED in near-UV range and blue light LED to excite, which can be used in white light LED devices.

The method for preparing fluorescent powder of the present invention comprises the steps: making nano-metal particles clad with silica first, then making fluorescent powder containing nano-metal particles. Compared to fluorescent powder non-containing nano-metal particles, due to the surface plasma resonance effect occurring on the surface of the nano-metal particles, the fluorescent powder has stronger luminous intensity. In addition, the preparation method is simple, no pollution, easy to control, low demand on equipment, easy to produce in industry, and can be widely used in the field of preparing fluorescent powder.

Special embodiments are disclosed as follows to demonstrate preparation method of fluorescent powder of halogen silicate containing nano-metal particles and the performances of it.

EXAMPLE 1

Preparation of Fluorescent Powder which is a Mixture of $CaCl_2 \cdot 2(Ca_{0.7}Eu_{0.3}O) \cdot SiO_2$ and $1 \times 10^{-2}Pt$ by High-Temperature Solid-Phase Method The preparation of Pt nanoparticles colloid is: weighing and dissolving 5.18 mg of chloroplatinic acid $(H_2PtCl_6 \cdot 6H_2O)$ in 17 mL of ethanol solution, after chloroplatinic acid dissolved completely, weighing and dissolving 8 mg of sodium citrate and 12 mg of sodium dodecyl sulfonate in aqueous solution of chloroplatinic acid under the condition of magnetic stirring; weighing and dissolving 0.38 mg of sodium borohydride in 10 mL of deionized water obtaining 10 mL of $1 \times 10^{-3}$ mol/L aqueous solution of sodium borohydride, preparing 10 mL of $1 \times 10^{-2}$ mol/L hydrazine hydrate solution at the same time; under the condition of magnetic stirring, adding 0.4 mL aqueous solution of sodium borohydride into aqueous solution of chloroplatinic acid, stirring and reacting for 5 min, and then adding 2.6 mL of $1 \times 10^{-2}$ mol/L hydrazine hydrate solution into aqueous solution of chloroplatinic acid, continue to react for 40 min, then obtaining 20 mL of Pt nanoparticles colloid containing $5 \times 10^{-4}$ mol/L of Pt; adding 0.2 g of PVP into Pt nanoparticles colloid, magnetically stirring for 3 h. The surface-treated Pt nanoparticle is obtained.

The preparation of $Pt@SiO_2$ microspheres: successively placing 10 mL of surface-treated Pt nanoparticles, 20 mL of ethanol into beaker, stirring, then adding 3 mL of ammonia water, 0.023 mL of tetraethyl orthosilicate, stirring for 2 h; then drying at constant temperature 80° C., pre-burning at 300° C. for 5 h, then grinding to obtain desired $M@SiO_2$ powder.

The preparation of fluorescent powder which is a mixture of $CaCl_2 \cdot 2(Ca_{0.7}Eu_{0.3}O) \cdot SiO_2$ and $1 \times 10^{-2}Pt$: weighing 0.0140 g of $CaCO_3$ (or 0.0221 g of $(CH_3COO)_2Ca$), 0.0155 g of $CaCl_2$ (be excessive 40% by weight), 0.0106 g of $Eu_2O_3$ (of 99.99% purity) and obtained $Pt@SiO_2$, microspheres grinding well in agate mortar, then placing into corundum crucible, pre-burning at 500° C. for 1 h, sintering for 1 h at 1200° C. in the reducing atmosphere of mixed gases consisting of $H_2$ and $N_2$ with volume ratio of 10:90; grinding, washing, drying, sieving to obtain fluorescent powder which is a mixture of $CaCl_2 \cdot 2(Ca_{0.7}Eu_{0.3}O) \cdot SiO_2$ and $1 \times 10^{-2}Pt$.

EXAMPLE 2

Preparation of Fluorescent Powder which is a Mixture of $CaCl_2 \cdot (Ca_{0.65}Eu_{0.05}Mn_{0.3}O) \cdot SiO_2$ and $9.24 \times 10^{-4}Au$ by High-Temperature Solid-Phase Method The preparation of Au nanoparticles colloid is: weighing and dissolving 4.12 mg of chloroauric acid $(AuCl_3 \cdot HCl \cdot 4H_2O)$ in 8.4 mL of deionized water, after chloroauric acid dissolved completely, weighing and dissolving 14 mg of sodium citrate and 6 mg of cetyl trimethyl ammonium bromide in aqueous solution of chloroauric acid under the condition of magnetic stirring; weighing and dissolving 1.9 mg of sodium borohydride and 17.6 mg of ascorbic acid in 10 mL of deionized water, respectively, obtaining 10 mL of $5 \times 10^{-3}$ mol/L aqueous solution of sodium borohydride and 10 mL of $1 \times 10^{-2}$ mol/L aqueous solution of ascorbic acid; under the condition of magnetic stirring, adding 0.04 mL aqueous solution of sodium borohydride into aqueous solution of chloroauric acid, stirring and reacting for 5 min, and then adding 1.56 mL of $1 \times 10^{-2}$ mol/L aqueous solution of ascorbic acid into aqueous solution of chloroauric acid, continue to react for 30 min, then obtaining 10 mL of Au nanoparticles colloid containing $1 \times 10^{-3}$ mol/L of Au; adding 0.01 g of PVP into Au nanoparticles colloid, magnetically stirring for 8 h. The surface-treated Au nanoparticle is obtained.

The preparation of $Au@SiO_2$ microspheres: successively placing 2 mL of deionized water, 8 mL of surface-treated Au nanoparticles, 25 mL of ethanol into beaker, stirring, then adding 6 mL of ammonia water, 1 mL of tetraethyl orthosilicate, stirring for 8 h; then drying at constant temperature 150° C., pre-burning at 500° C. for 2 h, then grinding to obtain desired $Au@SiO_2$ powder.

The preparation of fluorescent powder which is a mixture of $CaCl_2 \cdot (Ca_{0.65}Eu_{0.05}Mn_{0.3}O) \cdot SiO_2$ and $9.24 \times 10^{-4}Au$: weighing 0.2817 g of $CaCO_3$, 0.5290 g of $CaCl_2$ (be excessive 10% by weight), 0.0378 g of $Eu_2O_3$ (of 99.99% purity) (or 0.0520 g of $Eu_2(CO_3)_3$ (of 99.99% purity)), 0.1493 g of $MnCO_3$ (or 0.1130 g of $MnO_2$) and obtained $Au@SiO_2$, microspheres grinding well in agate mortar, then placing into corundum crucible, pre-burning at 800° C. for 3 h firstly, cooling, grinding, then sintering for 4 h at 1000° C. in the reducing atmosphere of carbon monoxide; grinding, washing, drying, sieving to obtain fluorescent powder which is a mixture of $CaCl_2.(Ca_{0.65}Eu_{0.05}Mn_{0.3}O).SiO_2$ and $9.24 \times 10^{-4}Au$.

EXAMPLE 3

Preparation of Fluorescent Powder which is a Mixture of $CaCl_2.(Ca_{0.95}Eu_{0.05}O).SiO_2$ and $1.155 \times 10^{-4}Ag$ by High-Temperature Solid-Phase Method The preparation of Ag nanoparticles colloid is: weighing and dissolving 3.40 mg of silver nitrate ($AgNO_3$) in 18.4 mL of deionized water, after silver nitrate dissolved completely, weighing and dissolving 22 mg of sodium citrate and 20 mg of PVP in aqueous solution of silver nitrate under the condition of magnetic stirring; weighing and dissolving 5.7 mg of sodium borohydride in 10 mL of deionized water obtaining 10 mL of $1.5 \times 10^{-2}$ mol/L aqueous solution of sodium borohydride; under the condition of magnetic stirring, adding 1.6 mL of $1.5 \times 10^{-2}$ mol/L aqueous solution of sodium borohydride into aqueous solution of silver nitrate at once, continue to react for 10 min, then obtaining 20 mL of Ag nanoparticles colloid containing $1 \times 10^{-3}$ mol/L of Ag; after that, adding 0.1 g of PVP into Ag nanoparticles colloid, magnetically stirring for 24 h. The surface-treated Ag nanoparticle is obtained.

The preparation of $Ag@SiO_2$ microspheres: successively placing 9.5 mL of deionized water, 0.5 mL of surface-treated Ag nanoparticles, 25 mL of ethanol into beaker, stirring, then adding 6 mL of ammonia water, 1 mL of tetraethyl orthosilicate, stirring for 8 h; then drying at constant temperature 100° C., pre-burning at 800° C. for 3 h, then grinding to obtain desired $M@SiO_2$ powder.

The preparation of fluorescent powder which is a mixture of $CaCl_2.(Ca_{0.95}Eu_{0.05}O).SiO_2$ and $1.155 \times 10^{-4}Ag$: weighing 0.4117 g of $CaCO_3$, 0.5290 g of $CaCl_2$ (be excessive 10% by weight), 0.0378 g of $Eu_2O_3$ (of 99.99% purity) and obtained $Ag@SiO_2$ microspheres, grinding well in agate mortar, then placing into corundum crucible for pre-burning at 980° C. for 3 h, then sintering for 3 h at 1000° C. in the reducing atmosphere of mixed gases consisting of $H_2$ and $N_2$ with volume ratio of 5:95; grinding, washing, drying, sieving to obtain fluorescent powder which is a mixture of $CaCl_2.(Ca_{0.95}Eu_{0.05}O).SiO_2$ and $1.155 \times 10^{-4}Ag$. The fluorescent powder $CaCl_2.(Ca_{0.95}Eu_{0.05}O).SiO_2$ is prepared using the same method.

Figure 2:
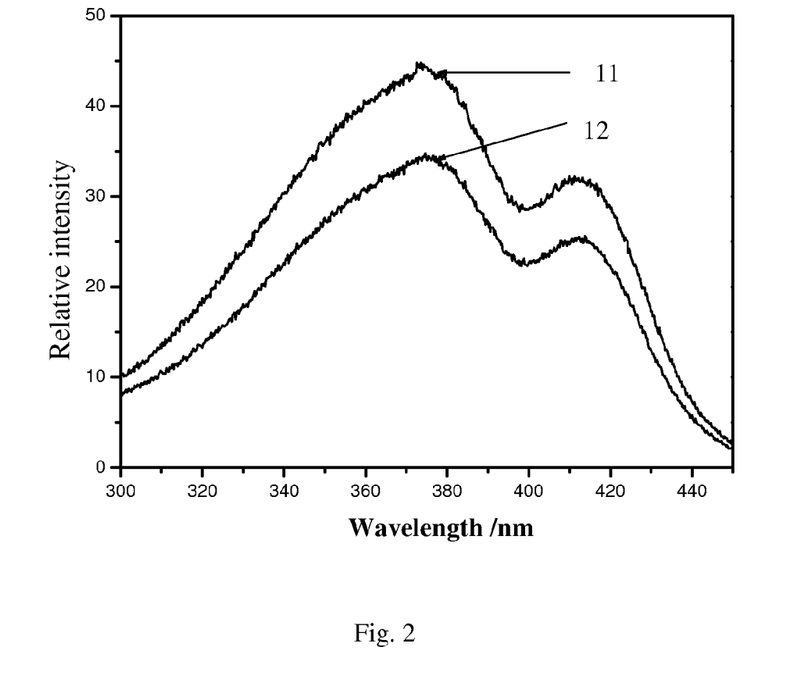
FIG. 2 is an excitation spectrum of fluorescent powder which is a mixture of $CaCl_2 \cdot (Ca_{0.95}Eu_{0.05}O) \cdot SiO_2$ and $1.155 \times 10^{-4}$Ag, in Example 3 of the present invention with respect to $CaCl_2 \cdot (Ca_{0.95}Eu_{0.05}O) \cdot SiO_2$ at a monitoring wavelength of 505 nm. Herein, curve 11 is the excitation spectrum of the fluorescent material which is a mixture of $CaCl_2 \cdot (Ca_{0.95}Eu_{0.05}O) \cdot SiO_2$ and $1.155 \times 10^{-4}$Ag; curve 12 is the excitation spectrum of the fluorescent material $CaCl_2 \cdot (Ca_{0.95}Eu_{0.05}O) \cdot SiO_2$.

FIG. 2 is an excitation spectrum of fluorescent powder which is a mixture of $CaCl_2.(Ca_{0.95}Eu_{0.05}O).SiO_2$ and $1.155 \times 10^{-4}Ag$ in Example 3 of the present invention with respect to $CaCl_2.(Ca_{0.95}Eu_{0.05}O).SiO_2$ at a monitoring wavelength of 505 nm. Herein, curve 11 is the excitation spectrum of the fluorescent material which is a mixture of $CaCl_2.(Ca_{0.95}Eu_{0.05}O).SiO_2$ and $1.155 \times 10^{-4}Ag$; curve 12 is the excitation spectrum of the fluorescent material $CaCl_2.(Ca_{0.95}Eu_{0.05}O).SiO_2$ It can be seen from FIG. 2 that there are broad excitation peaks at wavelength of about 370 nm and 410 nm, which indicates that such fluorescent powder can be used in LED.

Figure 3:
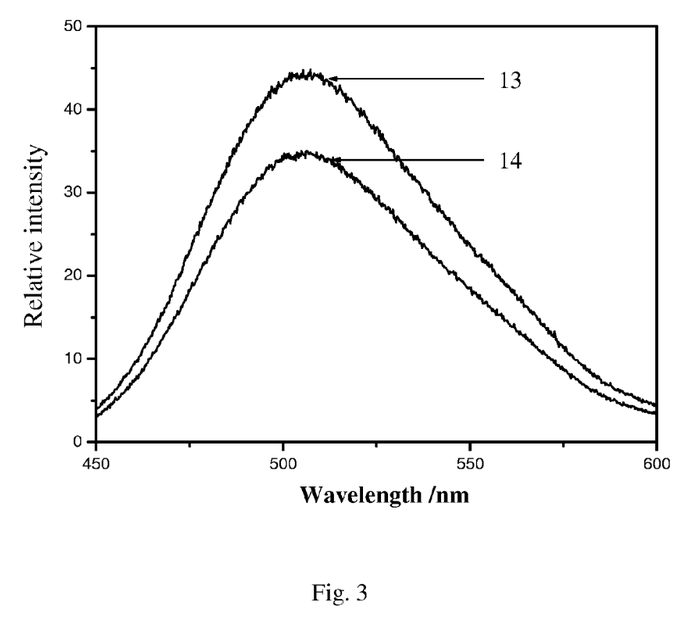
FIG. 3 is an emission spectrum of fluorescent powder which is a mixture of $CaCl_2 \cdot (Ca_{0.95}Eu_{0.05}O) \cdot SiO_2$ and $1.155 \times 10^{-4}$Ag in Example 3 of the present invention with respect to $CaCl_2 \cdot (Ca_{0.95}Eu_{0.05}O) \cdot SiO_2$ at an excitation wavelength of 370 nm. Herein, curve 13 is the emission spectrum of the fluorescent material which is a mixture of $CaCl_2 \cdot (Ca_{0.95}Eu_{0.05}O) \cdot SiO_2$ and $1.155 \times 10^{-4}$Ag; curve 14 is the emission spectrum of the fluorescent material $CaCl_2 \cdot (Ca_{0.95}Eu_{0.05}O) \cdot SiO_2$.

FIG. 3 is an emission spectrum of fluorescent powder which is a mixture of $CaCl_2.(Ca_{0.95}Eu_{0.05}O).SiO_2$ and $1.155 \times 10^{-4}Ag$ in Example 3 of the present invention with respect to $CaCl_2.(Ca_{0.95}Eu_{0.05}O).SiO_2$ at an excitation wavelength of 370 nm. Herein, curve 13 is the emission spectrum of the fluorescent material which is a mixture of $CaCl_2.(Ca_{0.95}Eu_{0.05}O).SiO_2$ and $1.155 \times 10^{-4}Ag$; curve 14 is the emission spectrum of the fluorescent material which is a mixture of $CaCl_2.(Ca_{0.95}Eu_{0.05}O).SiO_2$ and $1.155 \times 10^{-4}Ag$. It can be seen from FIG. 3 that, after being doped with metal, the luminous intensity of fluorescent powder is increased by about 25%.

EXAMPLE 4

Preparation of Fluorescent Powder which is a Mixture of $CaF_2.(Ca_{0.95}Eu_{0.05}O).SiO_2$ and $2.31 \times 10^{-4}Ag$ by High-Temperature Solid-Phase Method The preparation of Ag nanoparticles colloid is: weighing and dissolving 3.40 mg of silver nitrate ($AgNO_3$) in 18.4 mL of deionized water, after silver nitrate dissolved completely, weighing and dissolving 22 mg of sodium citrate and 20 mg of PVP in aqueous solution of silver nitrate under the condition of magnetic stirring; weighing and dissolving 5.7 mg of sodium borohydride in 10 mL of deionized water obtaining 10 mL of $1.5 \times 10^{-2}$ mol/L aqueous solution of sodium borohydride; under the condition of magnetic stirring, adding 1.6 mL of $1.5 \times 10^{-2}$ mol/L aqueous solution of sodium borohydride into aqueous solution of silver nitrate at once, continue to react for 10 min, then obtaining 20 mL of Ag nanoparticles colloid containing $1 \times 10^{-3}$ mol/L of Ag; after that, adding 0.1 g of PVP into Ag nanoparticles colloid, magnetically stirring for 24 h. The surface-treated Ag nanoparticle is obtained.

The preparation of $Ag@SiO_2$ microspheres: successively placing 9.0 mL of deionized water, 1 mL of surface-treated Ag nanoparticles, 25 mL of ethanol into beaker, stirring, then adding 6 mL of ammonia water, 1 mL of tetraethyl orthosilicate, stirring for 8 h; then drying at constant temperature 120° C., pre-burning at 600° C. for 3 h, then grinding to obtain desired $M@SiO_2$ powder.

The preparation of fluorescent powder which is a mixture of $CaF_2.(Ca_{0.95}Eu_{0.05}O).SiO_2$ and $2.31 \times 10^{-4}Ag$: weighing 0.4790 g of $CaC_2O_4$, 0.3718 g of $CaF_2$ (be excessive 10% by weight), 0.0378 g of $Eu_2O_3$ (of 99.99% purity) (or 0.0610 g of $Eu_2(C_2O_4)_3.xH_2O$ having a relative molecular mass of 567.99) and obtained $Ag@SiO_2$ microspheres, grinding well in agate mortar, then placing into corundum crucible for pre-burning at 980° C. for 3 h, then sintering for 3 h at 1000° C. in the reducing atmosphere of mixed gases consisting of $H_2$ and $N_2$ with volume ratio of 5:95; grinding, washing, drying, sieving to obtain fluorescent powder which is a mixture of $CaF_2.(Ca_{0.95}Eu_{0.05}O).SiO_2$ and $2.31 \times 10^{-4}Ag$.

EXAMPLE 5

Preparation of Fluorescent Powder which is a Mixture of $Ca(Cl_{0.97}F_{0.03})_2.(Ca_{0.95}Eu_{0.05}O).SiO_2$ and $1.155 \times 10^{-5}Pd$ by High-Temperature Solid-Phase Method The preparation of Pd nanoparticles colloid is: weighing and dissolving 0.43 mg of palladium chloride ($PdCl_2.2H_2O$) in 8.5 mL of deionized water, after palladium chloride dissolved completely, weighing and dissolving 11 mg of sodium citrate and 4.0 mg of sodium dodecyl sulfate in the aqueous solution of palladium chloride under the condition of magnetic stirring; weighing and dissolving 3.8 mg of sodium borohydride in 10 mL of deionized water, obtaining $1 \times 10^{-2}$ mol/L reducing aqueous solution of sodium borohydride; under the condition of magnetic stirring, adding rapidly 0.48 mL of $1 \times 10^{-2}$ mol/L aqueous solution of sodium borohydride into the aqueous solution of palladium chloride, continue to react for 20 min, then obtaining 10 mL of Pd nanoparticles colloid containing $1 \times 10^{-4}$ mol/L of Pd; then adding 0.05 g of PVP into the 10 mL of Pd nanoparticles colloid, magnetically stirring for 12 h. The surface-treated Pd nanoparticles colloid is obtained.

The preparation of Pd@SiO$_2$ microspheres: successively placing 9.5 mL of deionized water, 0.5 mL of surface-treated Pd nanoparticles, 25 mL of ethanol into beaker, stirring, then adding 6 mL of ammonia water, 1 mL of tetraethyl orthosilicate, stirring for 8 h; then drying at constant temperature 90° C., pre-burning at 700° C. for 3 h, then grinding to obtain desired Pd@SiO$_2$ powder.

The preparation of fluorescent powder which is a mixture of Ca(Cl$_{0.97}$F$_{0.03}$)$_2$.(Ca$_{0.95}$Eu$_{0.05}$O).SiO$_2$ and $1.155 \times 10^{-5}$Pd: weighing 0.4117 g of CaCO$_3$ (or 0.2307 g of CaO), 0.5594 g of CaCl$_2$ (be excessive 10% by weight), 0.0122 g of CaF$_2$ (be excessive 20% by weight), 0.0378 g of Eu$_2$O$_3$ (or 0.0353 g of Eu(CH$_3$COO)$_3$) (of 99.99% purity) and obtained Pt@SiO$_2$ microspheres, grinding well in agate mortar, then placing into corundum crucible for pre-burning at 980° C. for 3 h, then sintering for 3 h at 1000° C. in the reducing atmosphere of mixed gases consisting of H$_2$ and N$_2$ with volume ratio of 5:95; grinding, washing, drying, sieving to obtain fluorescent powder which is a mixture of Ca(Cl$_{0.97}$F$_{0.03}$)$_2$.(Ca$_{0.95}$Eu$_{0.05}$O).SiO$_2$ and $1.155 \times 10^{-5}$Pd.

EXAMPLE 6

Preparation of Fluorescent Powder which is a Mixture of CaCl$_2$.2(Ca$_{0.8}$Eu$_{0.1}$Mn$_{0.1}$O).SiO$_2$ and $1.155 \times 10^{-3}$Ag by High-Temperature Solid-Phase Method The preparation of Ag nanoparticles colloid is: weighing and dissolving 3.40 mg of silver nitrate (AgNO$_3$) in 18.4 mL of deionized water, after silver nitrate dissolved completely, weighing and dissolving 22 mg of sodium citrate and 20 mg of PVP in aqueous solution of silver nitrate under the condition of magnetic stirring; weighing and dissolving 5.7 mg of sodium borohydride in 10 mL of deionized water obtaining 10 mL of $1.5 \times 10^{-2}$ mol/L aqueous solution of sodium borohydride; under the condition of magnetic stirring, adding 1.6 mL of $1.5 \times 10^{-2}$ mol/L aqueous solution of sodium borohydride into aqueous solution of silver nitrate at once, continue to react for 10 min, then obtaining 20 mL of Ag nanoparticles colloid containing $1 \times 10^{-3}$ mol/L of Ag; after that, adding 0.1 g of PVP into Ag nanoparticles colloid, magnetically stirring for 24 h. The surface-treated Ag nanoparticle is obtained.

The preparation of Ag@SiO$_2$ microspheres: successively placing 10 mL of surface-treated Ag nanoparticles, 25 mL of ethanol into beaker, stirring, then adding 6 mL of ammonia water, 1 mL of tetraethyl orthosilicate, stirring for 8 h; then drying at constant temperature 80 to 150° C., pre-burning at 300 to 500° C. for 2 to 5 h, then grinding to obtain desired Ag@SiO$_2$ powder.

The preparation of fluorescent powder which is a mixture of CaCl$_2$.2(Ca$_{0.8}$Eu$_{0.1}$Mn$_{0.1}$O).SiO$_2$ and $1.155 \times 10^{-3}$Ag: weighing 0.6934 g of CaCO$_3$, 0.6728 g of CaCl$_2$ (be excessive 40% by weight), 0.1523 g of Eu$_2$O$_3$ (of 99.99% purity), 0.2122 g of Mn(OAc)$_2$.4H$_2$O (or 0.1238 g of MnC$_2$O$_4$.2H$_2$O) and obtained Ag@SiO$_2$ microspheres, grinding well in agate mortar, then placing into corundum crucible for pre-burning at 800° C. for 3 h, then sintering for 4 h at 1000° C. in the reducing atmosphere of hydrogen; grinding, washing, drying, sieving to obtain fluorescent powder which is a mixture of CaCl$_2$.2(Ca$_{0.8}$Eu$_{0.1}$Mn$_{0.1}$O).SiO$_2$ and $1.155 \times 10^{-3}$Ag.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A fluorescent powder of halogen-silicate containing nano-metal particles, wherein said fluorescent powder of halogen-silicate containing nano-metal particles is a mixture of CaX$_2$.y(Ca$_{1-a-b}$Eu$_a$Mn$_b$O).SiO$_2$ and zM, wherein X is fluorine and/or chlorine, y is 1 or 2, z is molar ratio of nano-metal particles and fluorescent powder CaX$_2$.y(Ca$_{1-a-b}$Eu$_a$Mn$_b$O).SiO$_2$, z is in a range of $0 < z \leq 1 \times 10^{-2}$, a is in a range of $0 < a \leq 0.3$, b is in a range of $0 \leq b \leq 0.3$, said nano-metal particles M is one of nano-metal particles Ag, Au, Pt or Pd.

2. A method for preparing fluorescent powder of halogen-silicate containing nano-metal particles, comprising:
   step 1, preparing nano-metal particles colloid;
   step 2, adding surface treating agent into nano-metal particles colloid to carry out surface treatment of nano-metal particles;
   step 3, adding absolute alcohol, deionized water and ammonia water to nano-metal particles colloid obtained in step 2, stirring, then adding tetraethyl orthosilicate with stirring and reacting, then drying, pre-burning, grinding to obtain the desired M@SiO$_2$ powder;
   step 4, selecting source compound of calcium, source compound of europium, source compound of manganese and a halogen containing calcium compound according to stoichiometric ratios, mixing, said stoichiometric ratios of the source compounds are according to the molar ratio of corresponding elements in CaX$_2$.y(Ca$_{1-a-b}$Eu$_a$Mn$_b$O), where X is fluorine and/or chlorine, y is 1 or 2, a is in a range of $0 < a \leq 0.3$, b is in a range of $0 \leq b \leq 0.3$, with a 10% to 40% by weight excess of calcium halide;
   step 5, adding M@SiO$_2$ powder obtained in step 3 into the mixture obtained in step 4, grinding, then pre-burning, cooling, grinding, then sintering in reducing atmosphere, grinding, washing, drying and sieving to obtain said fluorescent powder of halogen-silicate containing nano-metal particles.

3. The method for preparing fluorescent powder of halogen-silicate containing nano-metal particles as in claim 2, wherein said preparation of nano-metal particles colloid in said step 1 comprises: dissolving and diluting metal salt solution in ethanol or water, then adding one or more assistant agents which act as dispersant and stabilizer with stirring, adding reducing agent, after the reaction, nano-metal particles colloid is obtained.

4. The method for preparing fluorescent powder of halogen-silicate containing nano-metal particles as in claim 3, wherein said assistant agent is at least one of polyvinylpyrrolidone, sodium citrate, cetyl trimethyl ammonium bromide, sodium dodecyl sulfate and sodium dodecyl sulfonate; said reducing agent is at least one of hydrazine hydrate, ascorbic acid, sodium citrate and sodium borohydride.

5. The method for preparing fluorescent powder of halogen-silicate containing nano-metal particles as in claim 2, wherein in said step 2, polyvinylpyrrolidone is used as surface treating agent, weighing and adding 0.001 g/mL~0.1 g/mL of polyvinylpyrrolidone into nano-metal particles colloid, stirring for 3 to 24 hours at room temperature.

6. The method for preparing fluorescent powder of halogen-silicate containing nano-metal particles as in claim 2, wherein in said step 3, reacting time is in a range of 2 to 8 hours; drying is carried out under the constant temperature ranged from 80° C. to 150° C.; the temperature of pre-burning is in a range of 300° C. to 800° C.; the time of pre-burning is in a range of 2 to 5 hours; the volume of said tetraethyl orthosilicate equals the tetraethyl orthosilicate volume calculated according to the desired amount of the silicon source in final product.

7. The method for preparing fluorescent powder of halogen-silicate containing nano-metal particles as in claim 2, in said step 4, said source compound of calcium, source compound of europium and source compound of manganese are selected from one of their oxides, carbonates, acetates and oxalates.

8. The method for preparing fluorescent powder of halogen-silicate containing nano-metal particles as in claim 2, wherein in said step 5, the temperature of pre-burning is in a range of 500° C. to 1000° C.; the time of pre-burning is in a range of 1 to 12 hours; the temperature of sintering is in a range of 800° C. to 1200° C.; the time of sintering is in a range of 1 to 8 hours.

9. The method for preparing fluorescent powder of halogen-silicate containing nano-metal particles as in claim 2, wherein in said step 5, said reducing atmosphere is mixed gases of nitrogen and hydrogen, or pure hydrogen, or carbon monoxide.

* * * * *